United States Patent [19]

Pagano

[11] Patent Number: 4,890,713
[45] Date of Patent: Jan. 2, 1990

[54] PAN AND TILT MOTOR FOR SURVEILLANCE CAMERA

[76] Inventor: Raymond V. Pagano, P.O. Box 802, Lithonia, Ga. 30058

[21] Appl. No.: 223,104

[22] Filed: Jul. 22, 1988

[51] Int. Cl.⁴ .................. H04N 5/232; H01R 35/00; G05G 5/04
[52] U.S. Cl. .................. 192/142 R; 74/526; 242/47; 242/54 R; 242/85; 248/51; 248/183; 318/286; 318/470; 358/108; 358/229; 439/13
[58] Field of Search .............. 74/526; 192/142 R; 248/51, 52, 183; 318/286, 470; 242/47, 54 R, 85; 358/108, 229; 439/13, 15

[56] References Cited

U.S. PATENT DOCUMENTS

| | | | |
|---|---|---|---|
| 1,247,357 | 11/1917 | Young | 439/15 X |
| 3,012,447 | 12/1961 | Wallace | 74/526 |
| 3,028,445 | 4/1962 | Hurley | 439/13 X |
| 3,164,838 | 1/1965 | Heinrich | 358/229 X |
| 3,258,595 | 6/1966 | Galante | 358/108 X |
| 3,530,268 | 9/1970 | Aubrey | 358/108 X |
| 3,819,856 | 6/1974 | Pearl et al. | 358/108 |
| 4,233,634 | 11/1980 | Adams | 358/108 X |
| 4,427,170 | 1/1984 | Truninger | 248/51 |
| 4,654,703 | 3/1987 | Viera | 358/108 |
| 4,673,268 | 6/1987 | Wheeler et al. | 248/183 X |
| 4,722,690 | 2/1988 | Priede | 439/15 |
| 4,794,814 | 1/1989 | Ferguson, Jr. | 74/526 |

*Primary Examiner*—Allan D. Herrmann
*Attorney, Agent, or Firm*—James B. Middleton

[57] ABSTRACT

A pan and tilt mechanism for a surveillance camera that can pan through two full revolutions. A bell crank has one arm in the path of rotation of a pair of switches, and the bell crank can be shifted to extend the opposite arm. Each arm can be shifted by one switch, but will actuate the other switch to reverse the pan motor. The electrical cord for the mechanism and the camera is wound about the axis of rotation so the cord stays neat and undamaged through all rotation of the mechanism.

8 Claims, 2 Drawing Sheets

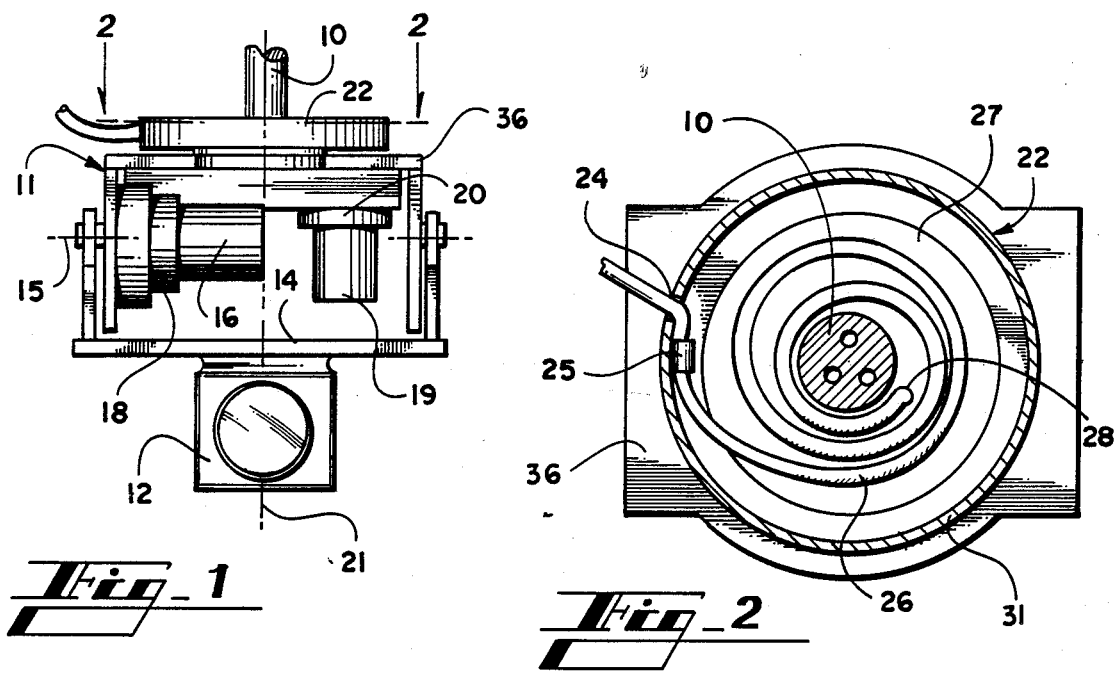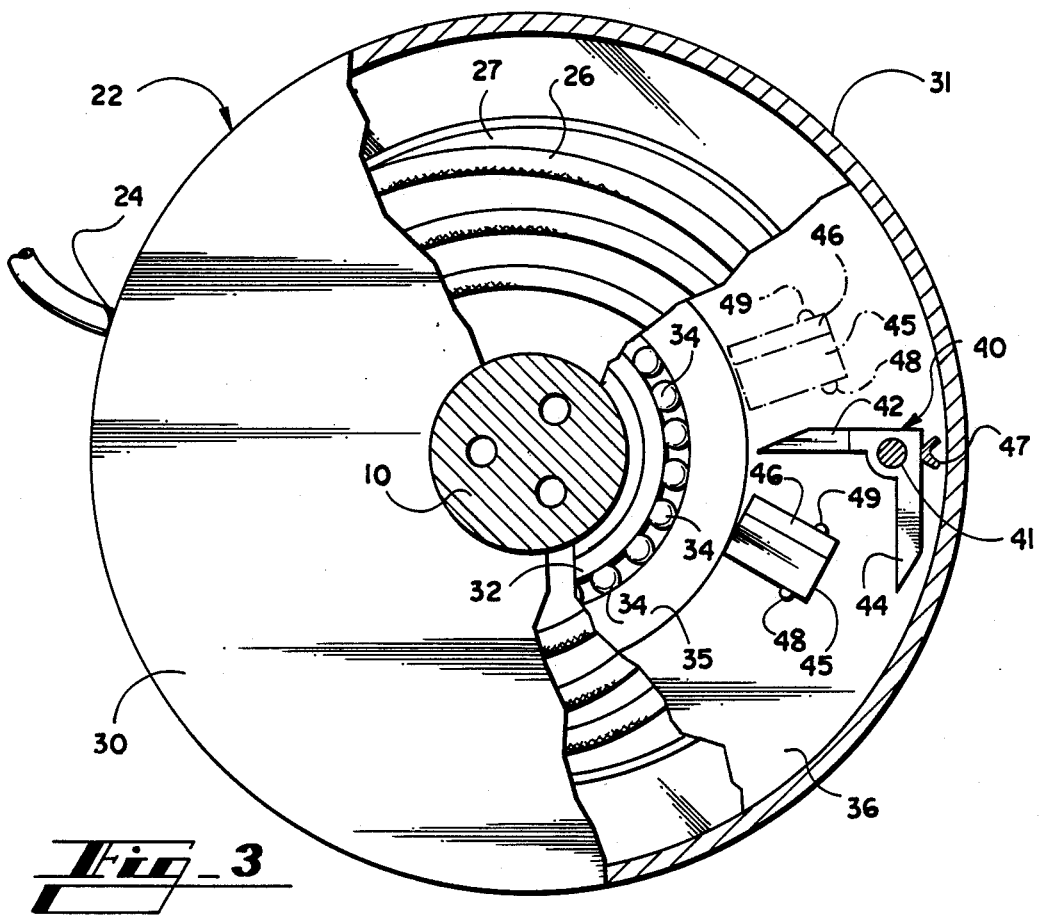

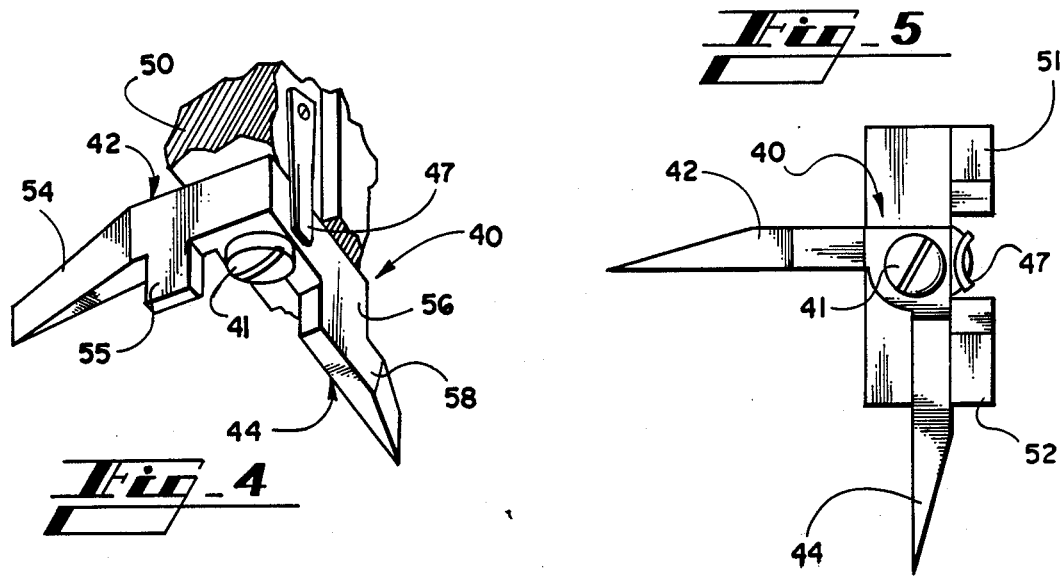
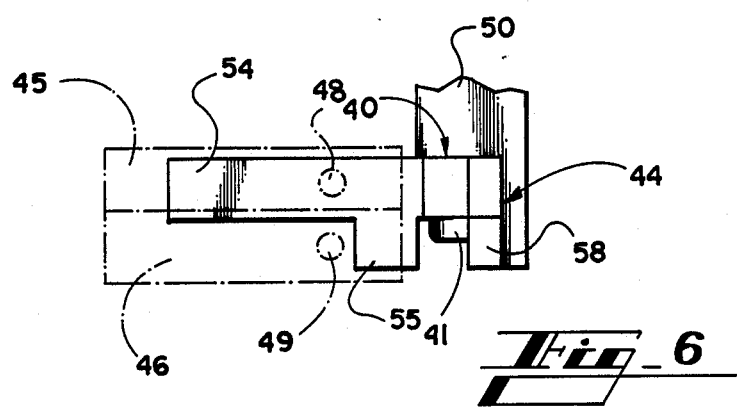

PAN AND TILT MOTOR FOR SURVEILLANCE CAMERA

INFORMATION DISCLOSURE STATEMENT

It is common to utilize a surveillance camera wherein the camera is mounted for movement in a vertical plane and for movement in a horizontal plane. Movement in a vertical plane tilts the camera so the lens is pointed generally horizontally or downwardly, and this motion is usually referred to in the trade as tilting. Movement in a horizontal plane points the lens of the camera from side to side, and is generally referred to as panning.

Pan and tilt motors for surveillance cameras commonly provide for approximately one rotation of the camera, i.e. about 360 degrees of rotation in panning. While it is obvious that 360 degrees of rotation will allow the camera to point in any given direction, the prior art devices normally have a fixed 0° position, and the camera cannot pan through the 0° or 360° position, but must be reversed. As a result, if the camera is panning, perhaps to follow a person or the like, and the camera reaches the 360° position, the camera must be reversed and move through the complete circle to reach the 0° position in order to continue to follow the person.

It will be understood that a camera or the like must have a power cord extending to the camera, and this power cord must include both electric power for operating the camera, and means for carrying the video signal. While the use of slip rings or the like will obviously allow any amount of rotation of the camera, slip rings are difficult to maintain properly, and tend to cause a large amount of noise in a video signal. The use of a flexible cord for carrying the power has been undesirable because the cord will become unduly twisted, and will eventually fail.

SUMMARY OF THE INVENTION

This invention relates generally to pan and tilt motors for surveillance cameras, and is more particularly concerned with a panning motor capable of rotation beyond one full rotation.

The present invention provides a pan and tilt drive including stationary means for supporting the drive unit, and cord reeling means between the stationary support and the rotatable camera mount. A shiftable arm indicates rotation through 360° and provides a stop to limit the maximum rotation. In one embodiment of the invention, the shiftable arm is in the form of a bell crank wherein a switch mechanically moves the bell crank in one direction, and the switch is actuated by the bell crank when the switch moves in the opposite direction. The panning device is therefore conveniently operable through two rotations, or 720°. At the end of the first 360° the bell crank will be shifted; and, at the end of the second 360° the bell crank will actuate the switch to reverse the mechanism.

BRIEF DESCRIPTION OF THE DRAWINGS

These and other features and advantages of the present invention will become apparent from consideration of the following specification when taken in conjunction with the accompanying drawings in which:

FIG. 1 is a side elevational view showing a pan and tilt apparatus made in accordance with the present invention;

FIG. 2 is an enlarged, cross-sectional view taken substantially along the line 2—2 in FIG. 1;

FIG. 3 is an enlarged, top plan view of the device shown in FIG. 1, portions thereof being broken away to illustrate the construction;

FIG. 4 is a perspective view showing the shiftable arm for use in the device of the present invention;

FIG. 5 is a bottom plan view of the arm shown in FIG. 4;

FIG. 6 is a front elevational view of the device illustrated in FIGS. 4 and 5; and, FIG. 7 is a schematic diagram illustrating the controls for the present invention.

DETAILED DESCRIPTION OF THE EMBODIMENT

Turning now more specifically to the drawings, and to that embodiment of the invention here presented by way of illustration, in FIG. 1 there is a bracket 10 for supporting the pan and tilt mechanism generally designated at 11, and a camera 12 is mounted on the mounting plate 14 of the mechanism 11.

The pan and tilt mechanism 11 includes a horizontal axis 15 about which the camera 12 will tilt, the tilting action being under the influence of the tilt motor 16. The tilt motor 16 is connected through gear reducers and the like designated at 18 for appropriately driving the shaft for rotation about the axis 15.

The pan and tilt mechanism 11 also includes a pan motor 19 which is connected through appropriate gearing designated at 20 for driving the mechanism 11 to rotate about the vertical axis 21. It will be understood that the support bracket 10 will be stationary while the pan and tilt mechanism 11 will rotate. The control housing designated at 22 is also stationary with respect to the bracket 10, and this will be discussed in more detail hereinafter.

Looking next at FIG. 2 of the drawings, it will be seen that the control housing 22 includes the reel of electrical cord for allowing rotation of the pan and tilt mechanism 11 with respect to the bracket 10. The electrical cord passes through the control housing 22 as is indicated at 24; then, the cord is preferably attached to the wall of the housing 22 as at 25. From the attachment 25, the electrical cord designated at 26 is wound in a helical path, the innermost end passing downwardly through the plate 27 into the pan and tilt mechanism 11 at 28.

As viewed in FIG. 2, the bracket 10 and the housing 22 will be stationary while the plate 27 through which the cord 26 passes at 28 will rotate for panning motion of the camera 12. The cord 26 is held substantially in a single plane, and is provided with sufficient turns to allow at least 720 degrees of rotation between the point 25 where the cord 26 is fixed, and the point 28 where the cord will move in a circle as the camera 12 pans.

Attention is next directed to FIG. 3 of the drawings for an understanding of the construction and operation of the control housing 22. In FIG. 3 of the drawings, various portions of the device are broken away to illustrate different levels within the housing.

Substantially at the left of FIG. 3, it will be seen that the housing 22 is provided with a cover 30, the cover 30 being stationary with respect to the bracket 10, along with the wall 31 of the housing 22. Where the cover 30 is broken away, it will be noted that the electric cord 26 is exposed, the cord 26 being in the helical pattern described above.

Centrally of the illustration in FIG. 3, it will be seen that the bracket 10 is fixed to the inside of a ball bearing indicated at 32 so that the inner race 32 will be stationary with respect to the bracket 10. The balls 34 are indicated between the inner race 32 and the outer race 35, it being understood that the outer race 35 is rotatable with respect to the inner race 32. Thus, it will be readily understood by those skilled in the art that the outer race 35 carries the plate 27 and the upper plate 36 of the pan and tilt mechanism 11. The bracket 10 and the control housing 22 will be stationary, and the pan motor 19 can be energized to cause rotation of the plate 36 and the rest of the pan and tilt mechanism.

Looking at the right-hand side of FIG. 3, there is a bell crank designated at 40 and having a pivot 41, and crank arms designated at 42 and 44. Adjacent to the bell crank 40, there is a pair of switches designated at 45 and 46, the switches 45 and 46 being in the nature of microswitches and having actuators designated at 48 and 49 respectively.

It must be understood that the bell crank 40 is carried by the cover 30 of the control housing 22. As a result, the bell crank 40 is stationary with respect to the bracket 10. The switches 45 and 46 are mounted on the plate 36 so the switches 45 and 46 are rotatable with respect to the bell crank 40. It will also be noted that there is a spring 47 urged against one arm of the bell crank 40. As will be discussed in more detail hereinafter, the spring 47 serves to retain the bell crank 40 in its selected position.

At this point, it should be understood that the pan motor 19 can be energized to cause rotation of the pan and tilt mechanism 11 with respect to the bracket 10 and the control housing 22. If the switches 45 and 46 are moving in a counterclockwise direction as shown in FIG. 3 of the drawings, the switches will engage the arm 42 of the bell crank 40, and the bell crank 40 can be rotated so that the arm 42 lies generally against the wall 31 of the housing 22, while the arm 44 will assume a generally radial position with respect to the housing 22. On the other hand, if the switches 45 and 46 are moving in a clockwise direction, and in the position of the switches shown in phantom in FIG. 3, the bell crank as illustrated in FIG. 3 cannot be further rotated; rather, the actuator 48 of the switch 45 will engage the arm 42, and the switch 45 will be actuated. Actuation of this switch can be used to indicate the end of possible rotation, and to reverse the motor 19.

Thus, it should be understood that the switches 45 and 46 can be rotated a first 360° with respect to the bell crank 40, and the bell crank 40 will be altered in its position. When the switches 45 and 46 continue rotation, and pass through a second 360°, the bell crank 40 cannot again be shifted, but will actuate a switch to indicate that the pan motor should be reversed.

For a better understanding of the operation of the reversing mechanism, attention is directed to FIGS. 4, 5 and 6 of the drawings. Here it will be seen that the bell crank 40 has a configuration to allow the body of the switches 45 and 46 to engage an arm of the bell crank to cause physical rotation of the bell crank without engaging the actuator 48 or 49 of the switch. In the opposite direction, when the bell crank 40 cannot be rotated, the appropriate arm of the bell crank 40 is arranged to engage the actuator 48 or 49 and cause actuation of the switch.

First, it should be seen that the bell crank 40 is carried by a block 50, the block 50 having extending walls 51 and 52; and, the spring 47 is fixed to the block 50 between the walls 51 and 52. As is best shown in FIG. 5 of the drawings, when the bell crank 40 is rotated to one position, for example with the arm 44 against the wall 52, the spring 47 will prevent inadvertent rotation of the bell crank 40, and the wall 52 will positively prevent further counterclockwise rotation of the bell crank 40. When the bell crank 40 rotates in the opposite direction, the arm 42 will lie against the wall 51 to prevent further rotation in the clockwise direction, and the spring 47 will engage the arm 42 to prevent inadvertent rotation in the counterclockwise direction.

The arm 42 of the bell crank 40 includes an elongated portion 54 that is adjacent to the upper surface of the block 50. Close to the pivot 41, the arm 42 includes an operating block 55. Thus, the switch 45 or 46 can engage the operating block 55 to rotate the bell crank 40, or a switch will engage the elongate portion 54 so the switch will be actuated. Similarly, the arm 44 has an upper operating block 56 and a lower elongated portion 58.

With attention especially to FIG. 6 of the drawings, it will be seen that, when the switches 45 and 46 move against the arm 42, the switch 46 will engage the operating block 55, but the actuator 49 of the switch 46 will not be engaged. As a result, the switch 46 will urge the bell crank 40 to rotate and shift its position. When the switches 45 and 46 are moving in the opposite direction, and the arm 42 is extending radially of the control housing 22, the actuator 48 of the switch 45 will be engaged by the arm 42 to cause actuation of the switch 45.

From the above description, it will be readily understood that the arm 44 provides the opposite arrangement. The switch 45 is in position to engage the operating block 56 of the arm 44, and the elongated portion 58 of the arm 44 is in position to engage the actuator 49 of the switch 46. As a result, regardless of the direction of rotation, the pan and tilt mechanism 11 can rotate 360°, and the bell crank 40 will be simply shifted to indicate that there has been one full circle of rotation. On continuing rotation, the bell crank 40 can be no further rotated, and a switch will be actuated to indicate a second full revolution. The pan motor 19 can be reversed, and the steps will be repeated.

Looking briefly at FIG. 7 of the drawings, it will be seen that the panning motor 19 is controlled by a drive reverse mechanism 60, the switches 45 and 46 being connected to the drive reverse mechanism 60. Thus, the pan motor 19 can be operated in one direction until one of the switches 45 or 46 is closed. Then, the drive reverse mechanism 60 will be operated to cause reversal of the pan motor 19.

Those skilled in the art will understand that pan and tilt mechanisms for surveillance cameras include rather sophisticated electronic control means; and, it will be understood that these control means are normally arranged to allow approximately 360 degrees of rotation of the camera. With the present invention, it is contemplated that the conventional electronics will be utilized so that the camera will normally pan through 360°. The significance of the present invention is that, in the event the camera is panning at the 0°/360° point, and the operator desires to continue in the same direction to follow something, the usual control can be overridden, and the mechanism can continue to pan in the same direction. Considering the above discussion, it will be understood that, at the 0°/360° position, the bell crank 40 will be shifted for an indication of one full rotation, but the mechanism can continue to rotate in the same direction. In the event that the operator attempts to pan through more than 720 degrees of rotation, one of the switches 45 and 46 will be actuated by the bell crank 40 to cause reversal of the pan motor 19.

It will therefore be seen that the apparatus of the present invention provides an extremely simple means for allowing two full rotations of a pan and tilt mechanism. A simple mechanical arm acts as an indicator of one full rotation, the position of the arm serving as a memory to indicate one full rotation, and the position of the arm in conjunction with a switch providing an indication of the second full rotation. The device is operable in either panning direction with equal results.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim:

1. In a pan and tilt mechanism for a surveillance camera, a bracket for mounting a pan and tilt mechanism, said mechanism including a camera mounting plate, said camera mounting plate being rotatable about a vertical axis for panning motion of the camera, a pan motor for causing panning motion of the camera, said mechanism being rotatable with respect to said bracket, the combination therewith of switch means for causing reversal of said pan motor, means for indicating one full revolution of said mechanism about said vertical axis, and means for actuating said switch means on two full revolutions of said mechanism, wherein said means for indicating one full revolution of said mechanism comprises an arm having a first position and a second position, and including means for moving said arm from said first position to said second position as said mechanism completes one full revolution about said vertical axis.

2. The combination as claimed in claim 1, wherein said arm comprises a bell crank rotatably mounted on a pivot which is stationary with respect to said bracket, said switch means for causing reversal including a microswitch carried by said mechanism and movable therewith, said bell crank being located in the path of rotation of said microswitch for engagement thereby on each rotation of said mechanism about said vertical axis.

3. The combination as claimed in claim 2, and further including stop means for said bell crank, the arrangement being such that said microswitch rotates said bell crank until said bell crank is against said stop means on said one full revolution of said mechanism, and said bell crank remains stationary and actuates said microswitch on said two full revolutions.

4. The combination as claimed in claim 3, and including an electrical cord electrically connected to said mechanism, a first portion of said electrical cord being fixed with respect to said bracket, a second portion of said cord being wound helically about said vertical axis substantially in a horizontal plane, said second portion having sufficient length to allow two revolutions of said mechanism with respect to said first portion.

5. Reversing means for a pan and tilt mechanism for a surveillance camera, said reversing means including a bell crank having a first arm and a second arm, said first arm including a first operating block carried thereby, said second arm including a second operating block carried thereby, a pair of switches rotatable with respect to said bell crank so that said pair of switches moves through the path of said bell crank, one switch of said pair of switches being located to engage said first operating block for pivoting said bell crank and for engaging said second arm for actuating said one switch, the other switch of said pair of switches being located to engage said second operating block for pivoting said bell crank and for engaging said first arm for actuating said other switch.

6. Reversing means as claimed in claim 5, and including spring means for resiliently maintaining said bell crank in a selected position, and stop means for limiting the pivoting motion of said bell crank.

7. A pan and tilt mechanism for a surveillance camera, said mechanism including a top plate rotatable about a vertical axis, a pan motor for causing rotation of said top plate, a control housing, said control housing including a cover and a side wall, said top plate being rotatable with respect to said control housing, an electrical cord electrically connected to said mechanism, said electrical cord having a first portion fixed to said control housing, and a second portion helically wound about said vertical axis within said control housing, said second portion having sufficient length to allow selective rotation of said mechanism with respect to said control housing, and further including memory means carried by said control housing for indicating when said mechanism has completed one full revolution with respect to said control housing, and reversing means for reversing said pan motor, said memory means including shiftable arm means having a first position and a second position, a switch located to shift said arm means on one revolution and to be actuated by said arm means on a second revolution.

8. A pan and tilt mechanism as claimed in claim 7, said arm means comprising a bell crank having two arms, and further including a second switch, said switch being located to shift one arm of said two arms and to be actuated by the other arm of said two arms, said second switch being located to shift the other arm of said two arms and to be actuated by said one arm of said two arms.

* * * * *